United States Patent
Wang et al.

(10) Patent No.: US 11,042,621 B2
(45) Date of Patent: Jun. 22, 2021

(54) PPG AUTHENTICATION METHOD AND DEVICE

(71) Applicant: Huawei Technologies Co., Ltd., Shenzhen (CN)

(72) Inventors: Chan Wang, Shenzhen (CN); Xi Huang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 117 days.

(21) Appl. No.: 16/339,652

(22) PCT Filed: Mar. 17, 2017

(86) PCT No.: PCT/CN2017/077118
§ 371 (c)(1),
(2) Date: Apr. 4, 2019

(87) PCT Pub. No.: WO2018/094920
PCT Pub. Date: May 31, 2018

(65) Prior Publication Data
US 2019/0236253 A1   Aug. 1, 2019

(30) Foreign Application Priority Data
Nov. 23, 2016   (CN) .......................... 201611037832.6

(51) Int. Cl.
*H04L 29/00* (2006.01)
*G06F 21/32* (2013.01)
(Continued)

(52) U.S. Cl.
CPC .............. *G06F 21/32* (2013.01); *G06F 1/163* (2013.01); *H04L 63/0884* (2013.01); *H04M 1/02* (2013.01)

(58) Field of Classification Search
CPC ........ G06F 1/163; G06F 21/32; G06F 21/606; G06F 3/017; G06F 3/04842; H04L 63/0884; H04M 1/02
See application file for complete search history.

(56) References Cited

U.S. PATENT DOCUMENTS

2013/0133055 A1* 5/2013 Ali .................. H04L 63/107
726/7

FOREIGN PATENT DOCUMENTS

| CN | 1540568 A | 10/2004 |
|---|---|---|
| CN | 103136533 A | 6/2013 |

(Continued)

OTHER PUBLICATIONS

Girish, N.S., et al., "An Enhanced Intrinsic Biometric in Identifying People by Photopleythsmography Signal," Proceedings of the Fourth International Conference on Signal and Image Processing, 2012, pp. 291-299.

(Continued)

*Primary Examiner* — Ghazal B Shehni
(74) *Attorney, Agent, or Firm* — Conley Rose, P.C.

(57) ABSTRACT

A photoplethysmogram (PPG) authentication method and device, where it is detected whether a terminal currently meets a PPG signal pre-collection trigger condition, and collection of a current PPG signal of a user is triggered only when the PPG signal pre-collection trigger condition is met such that the PPG signal of the user is pre-obtained before an application requests PPG authentication. In this way, when it is detected that the application initiates a PPG authentication request, PPG authentication may be directly performed based on a most recently collected PPG signal, thereby ensuring timeliness of PPG authentication, avoiding resource consumption caused by periodic PPG signal collection, and reducing power consumption.

20 Claims, 8 Drawing Sheets

(51) Int. Cl.
*H04M 1/02* (2006.01)
*G06F 1/16* (2006.01)
*H04L 29/06* (2006.01)

(56) References Cited

FOREIGN PATENT DOCUMENTS

| CN | 103155509 A | 6/2013 |
|---|---|---|
| CN | 103690168 A | 4/2014 |
| CN | 103761465 A | 4/2014 |
| CN | 103761645 A | 4/2014 |
| CN | 104615248 A | 5/2015 |
| CN | 105678539 A | 6/2016 |

OTHER PUBLICATIONS

Kavsaoglu, R.A., et al., "A novel feature ranking algorithm for biometric recognition with PPG signals," Computers in Biology and Medicine, 2014, pp. 1-14.
Bonissi, A., et al.,"A Preliminary Study on Continuous Authentication Methods for Photoplethysmographic Biometrics," IEEE, 2013, 6 pages.
Machine Translation and Abstract of Chinese Publication No. CN1540568, Oct. 27, 2004, 16 pages.
Machine Translation and Abstract of Chinese Publication No. CN103136533, Jun. 5, 2013, 16 pages.
Machine Translation and Abstract of Chinese Publication No. CN103761465, Apr. 30, 2014, 15 pages.
Machine Translation and Abstract of Chinese Publication No. CN14615248, May 13, 2015, 60 pages.
Machine Translation and Abstract of Chinese Publication No. CN105678539, Jun. 15, 2016, 12 pages.
Foreign Communication From A Counterpart Application, PCT Application No. PCT/CN2017-077118, English Translation of International Search Report dated Aug. 17, 2017, 2 pages.
Foreign Communication From A Counterpart Application, European Application No. 17874790.3, Extended European Search Report dated Jul. 23, 2019, 6 pages.
Machine Translation and Abstract of Chinese Publication No. CN103155509, Jun. 12, 2013, 23 pages.
Machine Translation and Abstract of Chinese Publication No. CN103690168, Apr. 2, 2014, 22 pages.
Machine Translation and Abstract of Chinese Publication No. CN103761645, Apr. 30, 2014, 13 pages.
Foreign Communication From A Counterpart Application Chinese Application No. 201780004026.5, Chinese Office Action dated Sep. 3, 2019, 6 pages.

* cited by examiner

PPG AUTHENTICATION METHOD AND DEVICE

CROSS-REFERENCE TO RELATED APPLICATIONS

This application is a U.S. National State of International Patent Application No. PCT/CN2017/077118 filed on Mar. 17, 2017, which claims priority to Chinese Patent Application No. 201611037832.6 filed on Nov. 23, 2016. Both of the aforementioned applications are hereby incorporated by reference in their entireties.

TECHNICAL FIELD

This application relates to the field of communications technologies, and in particular, to an identity authentication technology in a terminal.

BACKGROUND

With rapid development of information security technologies, people impose increasingly high requirements on security, convenience, and high efficiency of identity authentication. However, because biological feature information such as a fingerprint, a face, or voice is easily copied or faked, an identity authentication manner that is based on the biological feature information such as the fingerprint, the face, or the voice has a disadvantage of relatively poor reliability. To overcome the disadvantage, people propose a technology of performing identity authentication by using a photoplethysmogram (photoelectric plethysmography, PPG) signal.

The PPG signal is a signal that is detected from a living tissue by using a photoelectric means and that reflects a blood volume change. The PPG signal has many advantages, for example, it is difficult to fake the PPG signal, and a user is unaware of a collection process. However, before identity authentication is performed based on a PPG signal, a constant and stable PPG signal needs to be collected. Consequently, a PPG signal collection time is excessively long, and instant identity authentication cannot be implemented. To meet a requirement for instant identity authentication, a terminal periodically collects a PPG signal, so that when identity authentication needs to be performed based on a PPG signal, the PPG signal can be obtained in time. However, periodic PPG signal collection performed by the terminal occupies a relatively large quantity of resources, leading to excessively large power consumption.

SUMMARY

In view of this, this application provides a PPG authentication method and a device, to improve timeliness of PPG authentication and reduce power consumption generated during PPG authentication.

According to one aspect, an embodiment of this application provides a PPG authentication method. In the method, a terminal detects whether a PPG signal pre-collection trigger condition is met currently, and collects a current PPG signal of a user if the PPG signal pre-collection trigger condition is met currently. In this way, when it is detected that an application initiates a PPG authentication request, PPG authentication is performed based on a most recently collected PPG signal, thereby preventing timeliness of PPG authentication from being affected by an excessively long PPG signal collection time, and helping improve timeliness of PPG authentication. In addition, because the terminal collects a PPG signal only when the PPG signal pre-collection trigger condition is met, it indicates that the terminal collects a PPG signal only when determining that there is to be a PPG authentication need, thereby avoiding resource consumption caused by periodic PPG signal collection, and helping reduce power consumption.

In a possible design, the PPG signal pre-collection trigger condition may be: an application needing PPG authentication is started. Because after the application needing PPG authentication is started, the application needing PPG authentication may initiate a PPG authentication request, a PPG signal of the user is collected when the application is started. In this way, when the application initiates a PPG authentication request, a PPG signal of the user is pre-collected, so that PPG authentication can be directly performed by using the pre-collected PPG signal, thereby reducing a delay caused by real-time PPG signal collection, and ensuring timeliness of PPG authentication. In addition, a PPG signal is collected only when an application having a PPG authentication need is started, thereby avoiding excessively large power consumption caused by periodic PPG signal collection, and helping reduce power consumption of the terminal generated due to PPG authentication.

In a possible design, the PPG signal pre-collection trigger condition may be: an application needing PPG authentication is started, and a distance between a current geographical location of the terminal and a target geographical location is less than a first preset distance threshold. The target geographical location is a geographical location configured in the application, and the application initiates PPG authentication at the target geographical location. In this way, after the application is started, and before the terminal arrives at the target geographical location at which the application needs to initiate PPG authentication, the terminal may pre-collect a PPG signal of the user, so that when it is detected that the application initiates a PPG authentication request, PPG authentication can be directly performed based on the pre-collected PPG signal, thereby helping improve timeliness of PPG authentication. In addition, the terminal collects a PPG signal only when it is determined, based on the distance between the geographical location of the terminal and the target geographical location at which the application initiates PPG authentication, that there is a PPG authentication need currently, so that the terminal does not need to periodically collect a PPG signal, thereby reducing power consumption of the terminal.

In a possible design, the PPG signal pre-collection trigger condition may be: a time difference between a moment of executing a to-do list and a current moment is less than a first preset time threshold. When the moment of executing the to-do list arrives, an application executing the to-do list needs to initiate a PPG authentication request to the terminal. Therefore, before the moment of executing the to-do list arrives, the terminal pre-collects a PPG signal of the user, so that when the application executing the to-do list initiates a PPG authentication request, the terminal can directly complete PPG authentication based on the pre-collected PPG signal, thereby improving timeliness of PPG authentication. In addition, the terminal collects a PPG signal only when it is determined that the moment of executing the to-do list is to arrive, and there is a PPG authentication need currently, thereby avoiding power consumption caused by periodic PPG authentication collection of the terminal, and helping reduce power consumption of the terminal.

In a possible design, the PPG signal pre-collection trigger condition may be: a pre-trigger condition of an operation habit event, where a moment meeting the pre-trigger condition is earlier than a moment meeting an occurrence condition of the operation habit event. In this case, the terminal may pre-collect a PPG signal of the user before the operation habit event occurs, to avoid power consumption generated due to periodic PPG signal collection, and help reduce power consumption of the terminal. In addition, after an application initiates a PPG authentication request at the moment meeting the occurrence condition of the operation habit event, the terminal may directly perform PPG authentication based on the pre-collected PPG signal, thereby improving timeliness of PPG authentication.

In a possible design, the PPG signal pre-collection trigger condition may include one or more of the foregoing, and may further include another trigger condition determined based on a use environment of the terminal, to determine, based on the use environment of the terminal, whether a PPG data collection module of the terminal needs to be started in advance to collect a PPG signal.

In a possible design, that PPG authentication is performed based on the most recently collected PPG signal when the terminal detects the PPG authentication request initiated by the application may be: performing matching between the most recently collected PPG signal and a stored PPG template signal, to complete PPG authentication. In this manner, when the terminal needs PPG authentication, the terminal performs PPG authentication in real time by using the pre-collected PPG signal, thereby ensuring validity of a PPG authentication result, avoiding a case in which a PPG authentication result is invalid because a time length between a moment of generating the PPG authentication result and a current moment is excessively large, and helping reduce resource consumption generated due to PPG authentication.

In a possible design, after the current PPG signal of the user is collected, matching may be further performed between the collected PPG signal and a stored PPG template signal, and a matching result is stored as a PPG authentication result, so that PPG authentication is completed in advance before an application initiates a PPG authentication request. In this way, if it is detected that the application initiates the PPG authentication request, a most recently stored PPG authentication result may be directly invoked, thereby further reducing a time consumed for PPG authentication, and improving timeliness of PPG authentication.

According to another aspect, an embodiment of this application further provides another PPG authentication method. The method is applied to a wearable device. The wearable device pre-collects a first PPG signal of a user, extracts first PPG feature data included in the first PPG signal, establishes a PPG template based on the first PPG feature data, and stores the PPG template; maintains wearer identity information based on wearing detection; detects a use environment of the user equipment; when determining, based on the use environment and current wearer identity information, that a PPG data collection module needs to be started in advance, starts the PPG data collection module, to collect a second PPG signal of the user; and when the wearable device determines that PPG authentication currently needs to be performed, extracts second feature data based on the second PPG signal, and determines a matching degree between the extracted second feature data and the PPG template, to refresh the wearer identity information, to provide latest wearer identity information for a service application needing identity authentication.

According to another aspect, an embodiment of this application further provides a terminal. The terminal has a function of implementing actual terminal behavior in the foregoing method. The function may be implemented by hardware, or by hardware executing corresponding software. The hardware or software includes one or more modules corresponding to the foregoing function.

In a possible design, the terminal includes a memory, a processor, and a sensor. The processor is configured to support the terminal in performing the corresponding function in the foregoing method. The memory is configured to store a PPG signal pre-collection trigger condition, a PPG template signal, and the like in the foregoing PPG authentication method. The memory is further configured to: be coupled to the processor, and store a program instruction and data that are necessary for the terminal. The sensor is configured to support PPG signal collection in the foregoing PPG authentication method.

According to another aspect, an embodiment of this application further provides a PPG authentication apparatus. The apparatus includes a detection unit, a collection unit, and an authentication unit. The detection unit is configured to detect whether a PPG signal pre-collection trigger condition is met currently. The collection unit is configured to collect a current PPG signal of a user if the PPG signal pre-collection trigger condition is met currently. The authentication unit is configured to: if it is detected that an application initiates a PPG authentication request, perform PPG authentication based on the most recently collected PPG signal.

BRIEF DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

A PPG authentication method in embodiments of this application is applicable to a terminal. Specifically, the terminal may include but is not limited to mobile terminals such as a mobile phone, a mobile telephone, a mobile computer, a tablet computer, a personal digital assistant (Personal Digital Assistant, PDA), a media player, an intelligent wearable device (for example, a smartwatch, a smart band, smart glasses, and a head-mounted intelligent device), an e-reader, a handheld game console, and an in-vehicle electronic device, and may further include intelligent devices such as a smart television and a point of sales (Point of Sales, POS). The terminal specifically has functions such as running an application (Application, APP) program, connecting to a network, and positioning.

Figure 1:
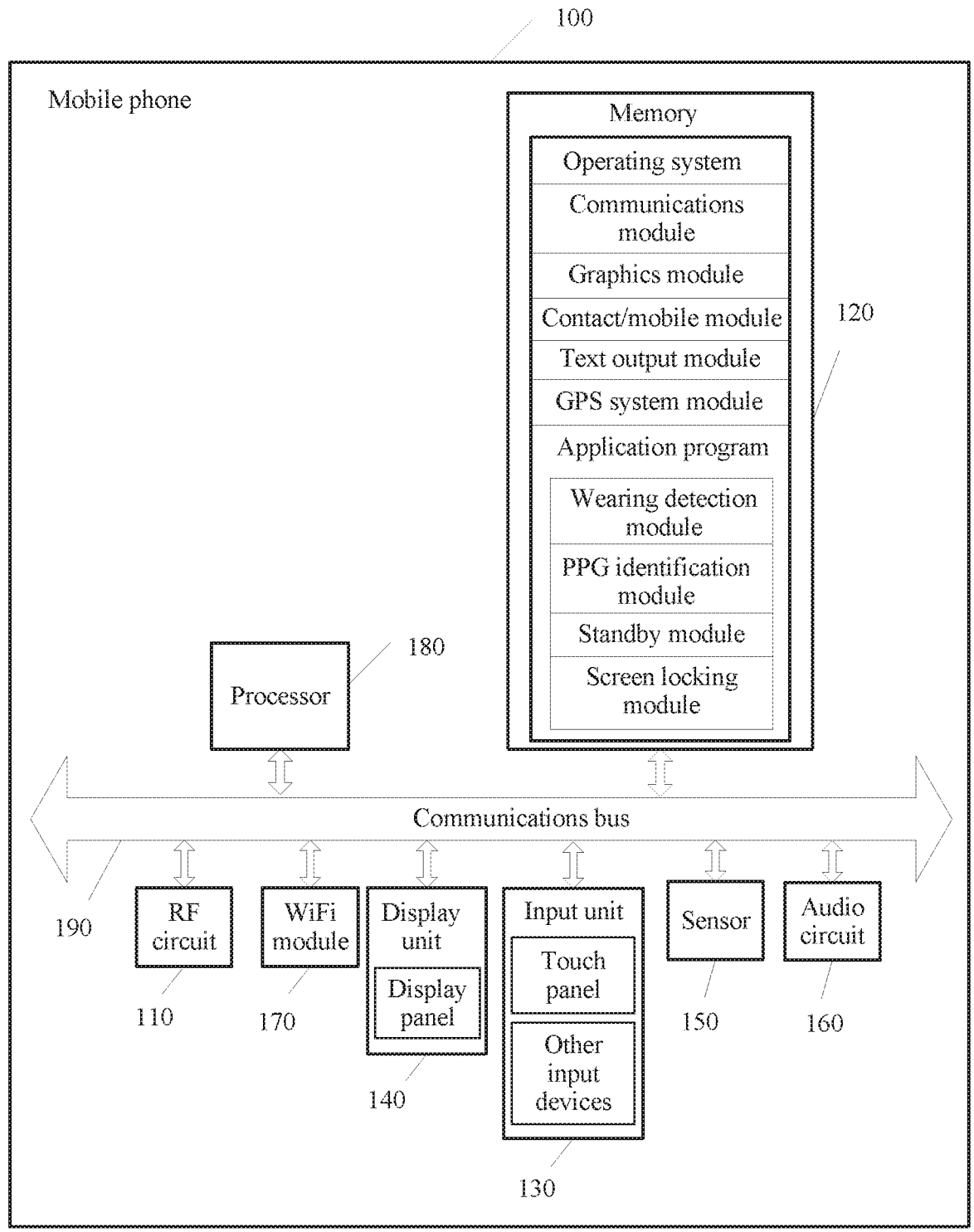
FIG. 1 is a schematic diagram of a compositional architecture of a mobile phone according to this application.

That the terminal is a mobile phone is used as an example. FIG. 1 is a schematic diagram of a part of a compositional structure of a mobile phone 100 according to an embodiment of this application.

Referring to FIG. 1, the mobile phone 100 includes components such as a radio frequency (Radio Frequency, RF) circuit 110, a memory 120, an input unit 130, a display unit 140, a sensor 150, an audio circuit 160, a Wireless Fidelity (wireless fidelity, WiFi) module 170, and a processor 180. The RF circuit 110, the memory 120, the input unit 130, the display unit 140, the sensor 150, the audio circuit 160, the WiFi module 170, and the processor 180 are connected by using a communications bus 190.

A person skilled in the art may understand that the structure of the mobile phone shown in FIG. 1 does not constitute a limitation on the mobile phone. The mobile phone may include more or fewer components than those shown in the figure, or may include a combination of some components, or may include different component arrangements.

The following specifically describes the constituent components of the mobile phone 100 with reference to FIG. 1.

The RF circuit 110 may be configured to: receive and send a signal in an information receiving or sending process or a call process. Particularly, the RF circuit 110 receives downlink information from a base station, then transmits the downlink information to the processor 180 for processing, and sends uplink data to the base station. Usually, the RF circuit 110 includes but is not limited to: an antenna, at least one amplifier, a transceiver, a coupler, a low noise amplifier (Low Noise Amplifier, LNA), and a duplexer. In addition, the RF circuit 110 may communicate with a network and another device through wireless communication. The wireless communication may use any communications standard or protocol, including but not limited to: the Global System for Mobile Communications (Global System of Mobile Communication, GSM), a general packet radio service (General Packet Radio Service, GPRS), Code Division Multiple Access (Code Division Multiple Access, CDMA), Wideband Code Division Multiple Access (Wideband Code Division Multiple Access, WCDMA), Long Term Evolution (Long Term Evolution, LTE), an e-mail, and a short message service (Short Messaging Service, SMS).

The memory 120 may be configured to store a software program and a module. For example, the memory may store data of a software program such as a positioning program in this application. The memory may further store data in a PPG authentication process, for example, a PPG template signal, information about a target geographical location configured in an application, security level information bound to the application, operation habit information of a user, and to-do list information. In a possible implementation, the memory 120 may mainly include a program storage area and a data storage area. The program storage area may store an operating system, an application program required by at least one function (such as a sound playing function, an image playing function, and a positioning function), and the like. The data storage area may store data created based on use of the mobile phone 100, for example, audio data, an address book, and the operation habit information of the user and the to-do list information that are mentioned above.

In addition, the memory 120 may include a high-speed random access memory, or may include a nonvolatile memory, for example, at least one magnetic disk storage component, a flash memory, or another volatile solid-state storage component.

The input unit 130 may be configured to: receive entered digit or character information, and generate key signal input related to user setting and function control of the mobile phone 100. Specifically, the input unit 130 may include a touch panel 131 and other input devices 132. The touch panel 131 is also referred to as a touchscreen, may collect a touch operation (for example, an operation performed by a, user on or near the touch panel 131 by using any suitable object or accessory such as a finger or a stylus) of the user on or near the touch panel 131, and drive a corresponding connection apparatus according to a preset program. In an implementation, the touch panel 131 may include two parts: a touch detection apparatus and a touch controller. The touch detection apparatus detects a touch position of the user, detects a signal generated by the touch operation, and sends the signal to the touch controller. The touch controller receives touch information from the touch detection apparatus, converts the touch information into touch point coordinates, and sends the touch point coordinates to the processor 180. Moreover, the touch controller can receive a command from the processor 180, and execute the command. In addition, the touch panel may be implemented by using a plurality of types, such as a resistive type, a capacitive type, an infrared ray, and a surface acoustic wave type. In addition to the touch panel, the input unit 130 may include other input devices. Specifically, the other input devices may include but are not limited to: one or more of a physical keyboard, a function key (such as a volume control key or an on/off key), a trackball, a mouse, and a joystick.

The display unit 140 may be configured to display information entered by the user or information provided for the user, and various menus of the mobile phone 100. The display unit 140 may include a display panel. In a possible case, the display panel may be configured by using a liquid crystal display (Liquid Crystal Display, LCD), an organic light-emitting diode (Organic Light-Emitting Diode, OLED), or the like. Further, the touch panel may cover the display panel. After detecting a touch operation on or near the touch panel, the touch panel sends the touch operation to the processor 180, to determine a type of a touch event. Then, the processor 180 provides a corresponding visual output on the display panel based on the type of the touch event. Although in FIG. 1, the touch panel and the display panel are used as two independent components to implement input and input functions of the mobile phone 100, in some embodiments, the touch panel and the display panel may be integrated to implement the input and output functions of the mobile phone 100.

The mobile phone 100 may further include at least one sensor 150, for example, a light sensor, a motion sensor, and another sensor. Specifically, the light sensor may include an ambient light sensor and a proximity sensor. The ambient light sensor may adjust luminance of the display panel based on brightness of ambient light. The proximity sensor may turn off the display panel 141 and/or backlight when the mobile phone 100 approaches an ear. As a motion sensor, an accelerometer sensor may detect acceleration values in all directions (usually on three axes), may detect a value and a direction of gravity when the accelerometer sensor is stationary, and may be applied to an application to recognize a mobile phone posture (for example, screen switching between landscape and portrait modes, a related game, and magnetometer posture calibration), a function related to vibration recognition (such as a pedometer and a knock), and the like.

Particularly, to collect a PPG signal used to reflect a blood volume change of the user, the mobile phone may include a PPG sensor configured to sense a PPG signal. A PPG data collection module configured to collect PPG data is preset in the PPG sensor.

Other sensors such as a gyroscope, a barometer, a hygrometer, a thermometer, and an infrared sensor may be configured in the mobile phone 100, and details are not described herein.

The audio circuit 160 may be connected to a loudspeaker and a microphone, to provide an audio interface between the user and the mobile phone 100. The audio circuit 160 may convert received audio data into an electrical signal, and transmit the electrical signal to the loudspeaker. The loudspeaker converts the electrical signal into a sound signal and outputs the sound signal. In addition, the microphone converts the collected sound signal into an electrical signal. The audio circuit 160 receives the electrical signal, converts the electrical signal into audio data, and then outputs the audio data to the RF circuit 110, so that the RF circuit 110 sends the audio data to, for example, another mobile phone, or outputs the audio data to the memory 120 for further processing.

WiFi belongs to a short-range wireless transmission technology. The mobile phone 100 may help, by using the WiFi module 170, the user to receive and send an email, browse a web page, access streaming media, and the like. The WiFi module 170 provides wireless broadband Internet access for the user. Although FIG. 1 shows the WiFi module 170, it may be understood that the WiFi module is not a mandatory part of the mobile phone 100, and can be omitted based on a requirement without changing the essence of the present invention.

The processor 180 is a control center of the mobile phone 100, connects all parts of the entire mobile phone by using various interfaces and lines, and performs various functions of the mobile phone 100 and processes data by running or executing the software program and/or the module stored in the memory 120 and invoking data stored in the memory 120, to perform overall monitoring on the mobile phone.

In this embodiment of this application, the processor may be configured to at least: detect whether a PPG signal pre-collection trigger condition is met currently; if the PPG signal pre-collection trigger condition is met currently, collect a current PPG signal of the user; and if it is detected that an application initiates a PPG authentication request, perform PPG authentication based on the most recently collected PPG signal. Specifically, the processor may be configured to implement a PPG authentication method provided in embodiments shown in FIG. 3 to FIG. 6A and FIG. 6B.

The processor 180 may include one or more processing units. In an implementation, an application processor and a modem processor may be integrated into the processor 180. The application processor mainly processes an operating system, a user interface, an application program, and the like. The modem processor mainly processes wireless communication. It may be understood that the modem processor may alternatively not be integrated into the processor 180.

The mobile phone 100 further includes a power supply (for example, a battery) for supplying power to the components. In a possible case, the power supply may be logically connected to the processor 180 by using a power management system, to implement functions of charging, discharging, and power consumption management by using the power management system.

Although not shown, the mobile phone 100 may further include a positioning module such as a GPS chip, and may obtain a current geographical location of the mobile phone by using the positioning module. Certainly, the mobile phone 100 may further include a camera, a Bluetooth module, and the like, and details are not described herein.

It should be noted that the foregoing merely provides a description by using an example in which the terminal is the mobile phone. However, it may be understood that when the terminal is another mobile terminal or intelligent device, composition of the terminal may be similar to that of the mobile phone, and details are not described herein.

The PPG authentication method in the embodiments of this application is a new biological feature identification method proposed based on a PPG technology. In the embodiments of this application, a signal that is detected from a living tissue based on the PPG technology is referred to as a PPG signal. For ease of understanding, the PPG technology and the PPG signal required for authentication in this application are briefly described.

The biological feature identification method proposed based on a PPG may be simply referred to as PPG identification. The PPG identification has the following advantages:

A PPG signal is a signal inside a body, it is difficult to fake a PPG signal, and the PPG signal has a good living feature and high security.

A characteristic of PPG detection is that the user is unaware of PPG detection, and detection may be performed constantly. In addition, because of the characteristic that the user is unaware of PPG detection and PPG detection may be performed constantly, a PPG signal may be used as a constant identity certificate and applied to a wearable device such as a smart band.

A PPG is easily combined with another external biological feature. When a PPG sensor is combined with another contact biological feature sensor, for example, a fingerprint sensor, it is also suitable to use a PPG as a living body detection feature and a second feature.

Currently, there are some paper researches on identity authentication using a PPG signal. For example, as early as in 2003, Yuanting, Zhang in the Chinese University of Hong Kong has proposed that the following several main variables of a PPG signal are used as parameters for identity authentication:

(1) a slope K1 of a rising segment;
(2) a slope K2 of a falling segment;
(3) peak values PEAK of two wave peaks; and
(4) duration T1 of the rising segment.

Figure 2:
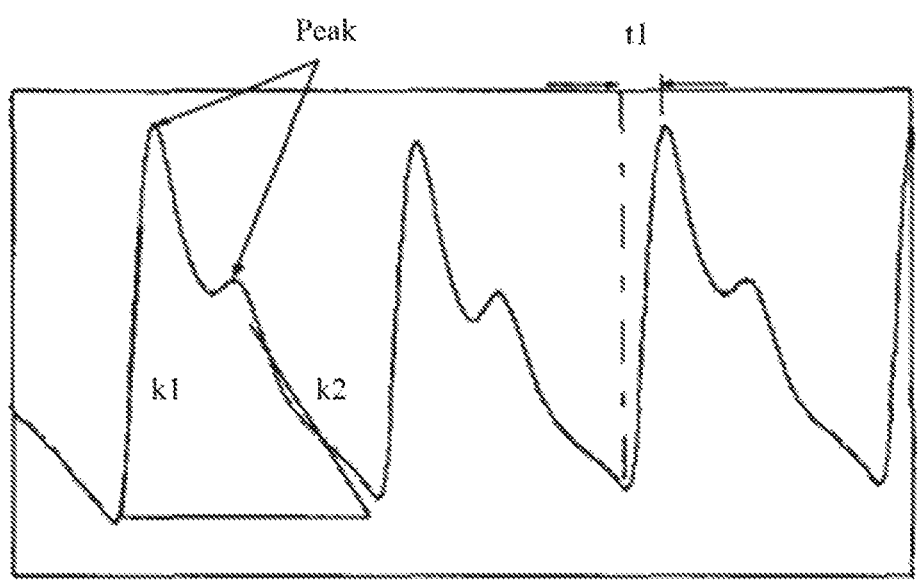
FIG. 2 is a schematic diagram of a blood volume change detected based on a PPG.

FIG. 2 is a schematic diagram of a blood volume change detected based on a PPG. Several main variables reflecting a blood volume change are marked in FIG. 2.

Accuracy of a final experimental result obtained after identity authentication is performed based on the foregoing several main variables is up to 94%.

The PPG signal in the embodiments of this application may include any one or more of the foregoing several parameters, and this is not limited herein.

In the PPG authentication method in the embodiments of this application, a running environment of the terminal is detected, and when it is detected that the terminal currently meets the PPG signal pre-collection trigger condition, collection of the current PPG signal of the user is triggered, to pre-obtain a PPG signal of the user before the application requests PPG authentication. In this way, when it is detected that the application initiates a PPG authentication request, PPG authentication can be directly performed based on a most recently collected PPG signal, thereby preventing timeliness of PPG authentication from being affected by an excessively long PPG signal collection time.

In addition, when the terminal currently meets the PPG signal pre-collection trigger condition, it indicates that the terminal is to generate a PPG authentication need, so that a PPG signal is collected only when it is determined that there is a PPG authentication need, thereby avoiding resource consumption caused by periodic PPG signal collection, and helping reduce power consumption.

The following describes, with reference to FIG. 1 by using an example in which a terminal is a smartwatch, a solution of a PPG authentication method provided in an embodiment of this application.

Figure 3:
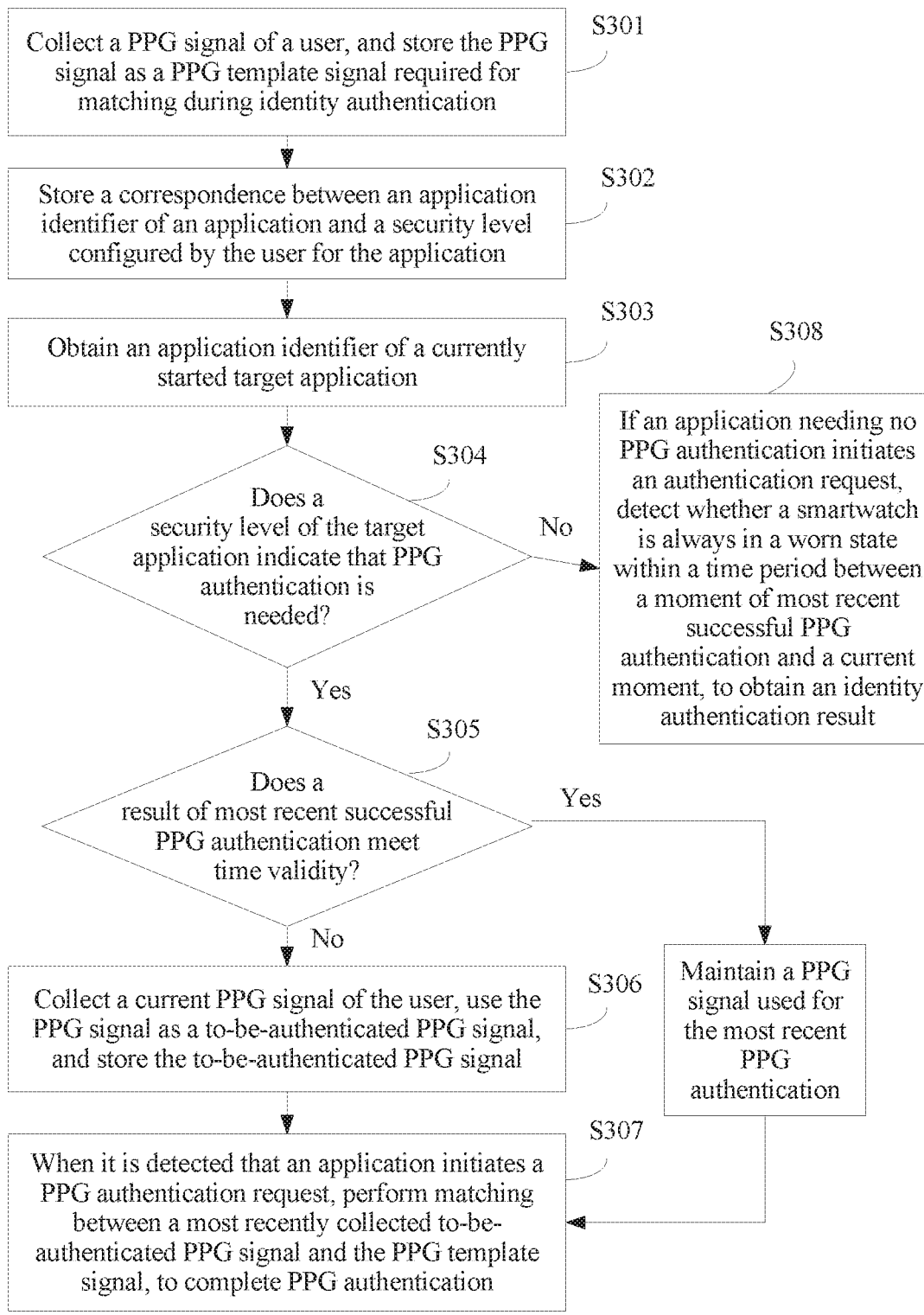
FIG. 3 is a schematic flowchart of an embodiment of a PPG authentication method according to this application.

FIG. 3 is a schematic flowchart of an embodiment of a PPG authentication method according to this application. The method in this embodiment may include the following steps.

S301. Collect a PPG signal of a user, and store the collected PPG signal as a PPG template signal required for matching during identity authentication.

The smartwatch has a wearing accessory, for example, a watch chain, that may be worn on a part of the user such as a wrist. After the user wears the smartwatch, the PPG signal of the user may be collected by using a PPG sensor built in the smartwatch, and a processor of the smartwatch may obtain, by using an interface connected to the PPG sensor, the PPG signal of the user collected by the PPG sensor. The processor may establish a PPG template based on the collected PPG signal, and may use the collected PPG signal as the PPG template signal required for a subsequent identity authentication process, so that during subsequent identity authentication, matching is performed between a collected to-be-matched PPG signal and the PPG template signal.

The generated PPG template signal may be stored in a memory.

In an implementation, the memory may include a PPG identification module. The PPG identification module uses collected PPG data of the user as a physiological feature of the user, to perform user identity identification. Correspondingly, after the processor obtains, by using the interface, the PPG signal of the user collected by the PPG sensor of the watch, the processor runs or executes the PPG identification module stored in the memory, to process the PPG signal, generate the PPG template signal, and store the PPG template signal in the memory, so that the PPG template signal is used for PPG signal matching in a subsequent authentication process.

The collected PPG signal may include one or more parameters mentioned above and reflecting a blood volume change. In this embodiment of this application, the PPG signal may be referred to as PPG data, and the PPG signal and the PPG data essentially have a same meaning.

S302. Receive a security level configured by the user for an application, and store a correspondence between an application identifier and the security level of the application.

For example, the user may perform a configuration operation in a configuration interface of the smartwatch or a configuration interface of the application, to configure security level information separately for different applications. For example, a touchscreen (or another input unit) of the smartwatch may receive a configuration operation that is entered by the user on the touchscreen of the smartwatch by using a finger or a stylus. The processor may determine, by identifying the configuration operation received on the touchscreen, a security level configured by the user for an application.

The security level may include different levels. For example, the security level may include a high security level and a low security level. The high security level indicates that PPG authentication needs to be performed. To be specific, the PPG template signal established above is a template configured for an application having a high security level. The low security level indicates that another manner other than PPG authentication may be used for identity authentication. Certainly, the security level may further include a security authentication-free level, and the security authentication-free level indicates that there is no need to perform identity authentication. The application identifier of the application is used to identify the application. For example, the application identifier may be a name, an identification number, and the like of the application.

It may be understood that storing, based on a correspondence, the identifier of the application and the security level configured by the user for the application is merely a manner, and an objective of this manner is to facilitate querying of the security level of the application when the application is subsequently started. However, in actual application, after the security level configured by the user for the application is received, there may be another manner of querying the security level corresponding to the application, and this is not limited herein.

It may be understood that in this embodiment of this application, the user configures the security level, to specify whether PPG authentication needs to be performed for the application. However, in actual application, there may be another manner of specifying whether PPG authentication is to be enabled for the application. For example, a corresponding option is provided for the user, so that the user chooses whether to enable PPG authentication for the application. Another manner of enabling PPG authentication for the application is also applicable to this embodiment, and this is not limited herein.

It should be noted that step S301 and step S302 are merely descriptions provided for clearer and complete understanding of a PPG authentication process. For example, step S301 is merely for clearer understanding of a source of a PPG template signal used in the PPG authentication process, and step S302 is how to determine whether an application has permission for PPG authentication. However, after a PPG template is stored and a security level of an application is set, there is no need to perform the two steps each time PPG authentication is performed. Particularly, when all applications need to complete user identity authentication through PPG authentication by default, there is no need to set security levels of the applications. To be specific, there is no need to perform step S302.

S303. If it is detected that an application is started, obtain an application identifier of the currently started target application.

A smartphone may monitor a start status of an application in the smartphone, and obtain an application identifier of a currently started application.

For example, an operation of starting an application by the user may be received by using the touchscreen of the smartwatch, and an obtained starting status of the application is transmitted to the processor. After receiving the starting status of the application, the processor obtains an application identifier of the started application by invoking an operating system interface in the memory.

It may be understood that identifying an application by using an application identifier of the application is merely an implementation, but is not an only implementation, provided that it can be identified which application in the smartwatch is a currently started application in actual application.

For ease of distinguishing, the currently started application is referred to as a target application.

S304. Query, based on the application identifier of the target application, whether a security level configured for the target application indicates that the target application is an application needing PPG authentication, and if the security level configured for the target application indicates that the target application is an application needing PPG authentication, perform step S305, or if the security level configured for the target application indicates that the target application is not an application needing PPG authentication, perform step S308.

For example, if the security level configured by the user for the currently started application is a high security level, it indicates that the currently started application is an application for which PPG authentication is enabled, and an operation required for subsequent PPG authentication needs to be performed. Correspondingly, if the security level corresponding to the currently started application is a low security level, it indicates that there is no need to perform PPG authentication, and therefore a PPG signal of the user needs to be pre-collected.

Further, if the application is an application needing no PPG authentication, when the processor detects that the application initiates an authentication request, an operation of step S308 may be performed, to perform authentication in a wearing detection manner. For details, refer to descriptions of step S308.

S305. Detect whether an identity authentication result obtained after the smartwatch successfully performs PPG authentication most recently still meets time validity, and if the identity authentication result meets the time validity, determine that the authentication succeeds, and maintain a PPG signal used for the most recent PPG authentication, or if the identity authentication result does not meet the time validity, perform step S306.

Certainly, when the authentication result of the most recent successful PPG authentication meets the time validity, the result of the most recent PPG authentication may be maintained, so that the result of the most recent PPG authentication can be directly invoked subsequently, and there is no need to perform matching between the PPG signal used for the most recent PPG authentication and the PPG template signal.

Time validity of an identity authentication result of PPG authentication may be a preset time length specified based on a requirement. For example, the time validity may be 10 minutes. Then, if a time length between a moment at which an operating system of the smartwatch successfully performs PPG authentication most recently and a current moment is less than 10 minutes, it indicates that a most recent identity authentication result is still a valid authentication result, and it may be determined that PPG-based user identity authentication succeeds.

When the most recent authentication result meets the time validity, the PPG signal used for the most recent PPG authentication may not be updated. In this way, if the smartwatch subsequently receives a PPG authentication request initiated by any application, the PPG signal for the most recent PPG authentication may be invoked, so that matching may be performed between the PPG signal and the PPG template signal. Alternatively, the authentication result of the most recent PPG authentication is maintained. In this way, when a PPG authentication request initiated by an application is detected subsequently, the authentication result of the most recent PPG authentication may be invoked and returned to the application.

For example, after completing PPG authentication, the smartwatch may store an identity authentication result of PPG authentication in the memory. Correspondingly, when the processor detects that an application is started, and the started application is an application needing PPG authentication under configuration of the user, the processor initiates a request to the memory, so that the processor accesses the memory, and invokes the PPG identification module in the memory to determine whether an identity authentication result of most recent successful authentication of the smartwatch meets the time validity, and if the identity authentication result meets the time validity, directly returns the authentication result of the most recent PPG authentication to the application.

It should be noted that after it is determined that the target application is an application needing PPG authentication, performing step S305 is merely an implementation. In actual application, after it is determined that the target application is an application needing PPG authentication, step S305 may not be performed and step S306 is directly performed.

S306. Collect a current PPG signal of the user, use the current PPG signal as a to-be-authenticated PPG signal, and store the to-be-authenticated PPG signal.

If the currently started target application is an application needing PPG authentication, after the target application is started, a PPG signal of the user is pre-collected. In this way, when the target application requests PPG authentication, the PPG signal of the user is collected, thereby preventing timeliness of PPG authentication from being affected by an excessively long signal collection time caused by real-time PPG signal collection when the target application requests PPG authentication.

For example, the smartwatch starts the PPG sensor, to collect a PPG signal of the user at a current moment and store the PPG signal. Specifically, the processor invokes the PPG sensor by using the interface, and starts a PPG data collection module in advance by using the PPG sensor, to collect the PPG signal of the user and store the PPG signal in the memory.

S307. When a PPG authentication request initiated by an application is detected, perform matching between a most recently stored to-be-authenticated PPG signal and the PPG template signal, to complete PPG authentication.

The application may set, based on a requirement, a condition of performing PPG authentication. If the condition of PPG authentication is met currently, a PPG authentication request may be submitted to the operating system of the smartwatch. For example, when the user opens the application, PPG authentication needs to be performed, and the user can open the application only when PPG authentication succeeds. Alternatively, when the user enters an interface of the application, PPG authentication needs to be performed, and the user can enter the interface only when PPG authentication succeeds.

Performing matching between the to-be-authenticated PPG signal and the PPG template signal may be as follows: The processor verifies whether a similarity between the to-be-authenticated PPG signal and the PPG template signal stored in the memory meets a requirement, and if the similarity between the to-be-authenticated PPG signal and the PPG template signal exceeds a specified threshold, the processor may determine that the to-be-authenticated PPG signal matches the PPG template signal. Specifically, it may be detected whether a similarity between one or more parameters used for identity authentication and included in the to-be-authenticated PPG signal and corresponding parameters in the PPG template signal exceeds a specified threshold. Correspondingly, if the to-be-authenticated PPG signal matches the PPG template signal, the user identity authentication succeeds, or if the to-be-authenticated PPG signal does not match the PPG template signal, the user identity authentication fails.

It may be understood that each time the smartwatch detects that an application needing PPG authentication is started, the smartwatch triggers PPG signal collection once. In this way, the smartwatch may store a plurality of to-be-authenticated PPG signals. However, an application currently initiating a PPG authentication request may not be a target application that is started most recently. Therefore, to improve PPG authentication accuracy, when an application initiates a PPG authentication request, the smartwatch may obtain a most recently stored to-be-authenticated PPG authentication, and perform matching between the most recently stored to-be-authenticated PPG signal and the PPG template signal, to complete identity authentication.

Certainly, to reduce a data storage amount in the memory, the smartwatch may store only a most recently collected to-be-authenticated PPG signal. In this case, when an application initiates a PPG authentication request, the PPG signal stored in the smartwatch may be directly invoked and matching is performed between the stored PPG signal and the PPG template.

It should be noted that step S307 is merely described by using an example in which identity authentication is performed based on the stored to-be-authenticated PPG signal. In the manner of step S307, a pre-collected and stored to-be-authenticated PPG signal is invoked for matching with the PPG template signal only when an application has a need of performing identity authentication based on PPG identification (or needs a PPG identification function). However, it may be understood that in actual application, there may be a plurality of other possible manners of performing identity authentication based on the to-be-authenticated PPG signal.

For example, in another manner of performing user identity authentication based on the to-be-authenticated PPG signal, when a PPG authentication request of an application is detected, a time interval between a current moment and a moment of storing the to-be-authenticated PPG signal may be determined, and it may be determined whether the time interval is greater than a preset time threshold. If the time interval is less than the preset time threshold, matching is performed between the to-be-authenticated PPG signal and the PPG template signal, to perform user identity authentication. If the time interval is greater than the preset time threshold, a current PPG signal of the user is re-collected, and matching is performed between the currently collected PPG signal and the PPG template signal, to perform user identity authentication. In this manner, to improve identity identification accuracy, before identity authentication is performed based on the stored to-be-authenticated PPG signal, it needs to be determined whether the to-be-authenticated PPG signal exceeds the preset time threshold, to ensure validity of the to-be-authenticated PPG signal.

The preset time threshold may be set based on a requirement. It should be noted that the operating system of the smartwatch may use a same time threshold for different applications, or store a time threshold corresponding to each application. For example, the user may set, based on a security level required by an application, a time threshold allowed by the application in the operating system or the application, and the smartwatch stores a time threshold of each application. Particularly, when each application corresponds to a different time threshold, if a PPG authentication request initiated by an application is detected, after the time interval between the current moment and the moment of storing the to-be-authenticated PPG signal is determined, it may be determined whether the time interval is greater than a time threshold corresponding to the application initiating the PPG authentication request. In another manner of performing user identity authentication based on the to-be-authenticated PPG signal, after the to-be-authenticated PPG signal is collected, matching may be directly performed between the to-be-authenticated PPG signal and the PPG template signal, to perform user identity authentication, and an authentication result is stored as a PPG authentication result. If the PPG authentication request of the application is detected (for example, it is detected that a PPG identification function is invoked), when PPG authentication needs to be performed, a most recently stored PPG authentication result may be invoked and returned to the application.

It may be understood that after a PPG authentication result is obtained in step S307, the processor may further return the PPG authentication result to the application initiating the PPG authentication request.

S308. If an application needing no PPG authentication initiates an authentication request, detect whether the smartwatch is always in a worn state within a time period between a moment at which PPG authentication on the user succeeds most recently and a current moment, and when it is detected that the smartwatch is always in the worn state, determine that user identity authentication succeeds.

In this embodiment of this application, identity authentication is performed through wearing detection. This case is applicable to an intelligent device that can be worn on a part of a body of the user, for example, a smartwatch and a head-mounted intelligent device. Wearing detection means that it is detected, by using a proximity sensor or a buckle, whether the smartwatch of the user is in a worn state or a taken-off state. For example, it is detected, by using the proximity sensor or the buckle, whether the smartwatch is not in contact with skin. If the smartwatch is in contact with the skin, it is determined that the smartwatch of the user is in the worn state. If it is detected that the smartwatch of the user is not in contact with the skin, it is determined that the smartwatch of the user is in the taken-off state. For an application having a low security level, after the smartwatch performs PPG authentication on the user and determines that PPG authentication on the user succeeds, if the user never takes off the smartwatch, it indicates that a wearer wearing the smartwatch does not change. In this case, it may be considered that identity information authentication on the wearer succeeds. If the smartwatch is not in the worn state, or if the wearer takes off the smartwatch within a time period between a moment at which PPG authentication of the target application on the user succeeds most recently and a current moment, identity information authentication on the wearer fails.

It may be understood that this embodiment of this application is described by using an example in which identity authentication is performed, through wearing detection, for the target application having a low security level. However, a person skilled in the all may understand that another manner used for identity authentication for the application having the low security level is also applicable to this application. For example, identity authentication may be performed, based on a password, a fingerprint, and the like, for the application having the low security level. For another example, there may be no need to perform identity authentication for the application having the low security level.

In this embodiment, when it is determined that the currently started application is an application needing PPG authentication, the current PPG signal of the user may be collected and stored. In this way, when PPG authentication needs to be performed for the application, matching may be directly performed based on the collected and stored PPG signal and the PPG template signal, to perform user identity authentication, thereby preventing timeliness of PPG authentication from being affected by an excessively long PPG signal collection time, and ensuring timeliness of PPG authentication.

In addition, the PPG signal is collected only when it is determined that the application is started and PPG authentication needs to be performed for the application, thereby avoiding resource consumption caused by periodic PPG signal collection, and helping reduce power consumption.

Figure 4A:
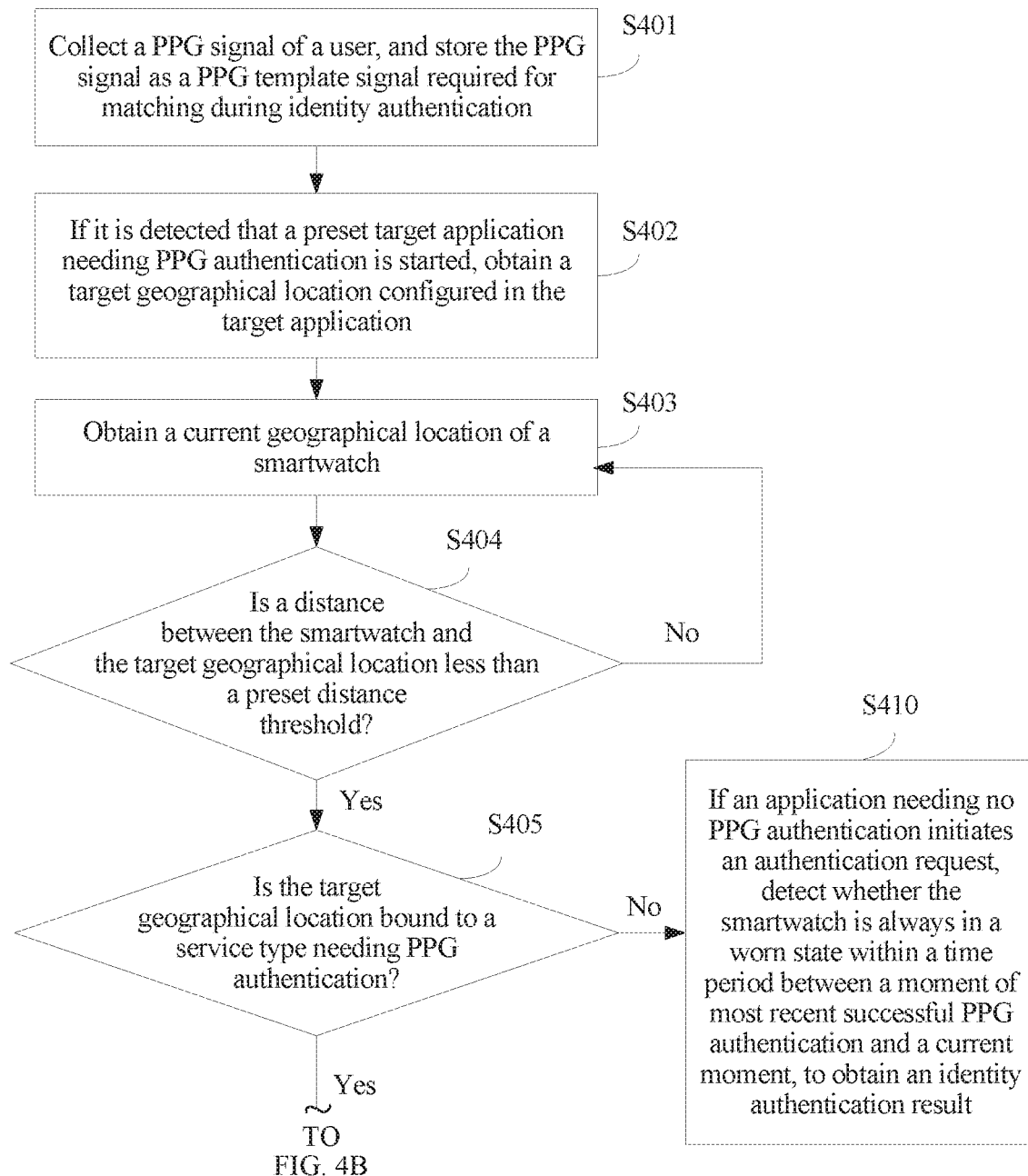
FIG. 4A and FIG. 4B are a schematic flowchart of another embodiment of a PPG authentication method according to this application.
Figure 4B:
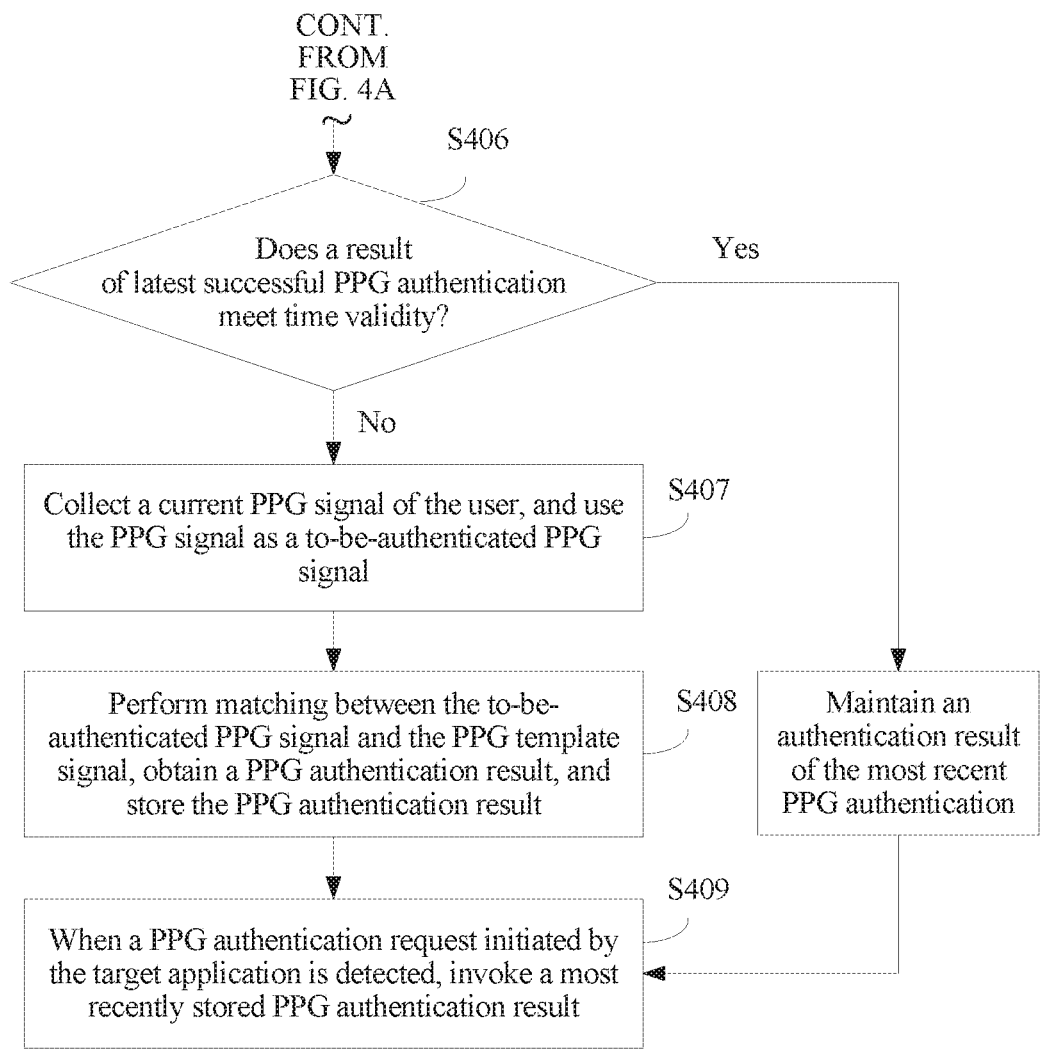

It may be understood that in the embodiment of FIG. 3, a PPG signal of a user is pre-collected before PPG authentication needs to be performed for an application. However, it may be understood that there may be a plurality of PPG signal pre-collection trigger conditions, and FIG. 3 is merely described by using one of the PPG signal pre-collection trigger conditions as an example. In actual application, there may be another condition of triggering pre-collection of a PPG signal of the user. For example, FIG. 4A and FIG. 4B are a schematic flowchart of another embodiment of a PPG authentication method according to this application. The method in this embodiment may include the following steps.

S401. A smartwatch collects a PPG signal of a user, and stores the collected PPG signal as a PPG template signal required for matching during identity authentication.

For step S401, refer to the related descriptions of step S301, and details are not described herein again.

S402. If it is detected that a preset target application needing PPG authentication is started, obtain a target geographical location configured in the target application.

The target application may be set based on a requirement. There may be one or more target applications. For example, a plurality of applications having a relatively high security requirement and related to transfer, payment, check-in, and the like are set as applications needing PPG authentication. For example, identifier information and the like of each target application may be stored in a memory. After detecting that an application is started, a processor may query the memory to verify whether an identifier of the currently started application is an identifier that is stored in the memory and that is of an application needing PPG authentication.

A manner in which the processor detects that the target application is started may be that the processor detects that there is an operation used to trigger starting of the target application on a touchscreen, or the processor detects, by using an interface, that the application is started. For details, refer to the related descriptions of the foregoing embodiment.

The target geographical location configured in the target application may be preset, and when the smartwatch arrives at the target geographical location, a PPG authentication function usually needs to be enabled. For example, the target application may be taxi hailing application software. When fare payment is made by using the taxi hailing application software, user identity authentication needs to be performed based on PPG identification. Then, the user may set a home address, a company location, or the like of the user as a target geographical location, so that collection of a PPG signal of the user is triggered in advance before the user subsequently arrives at the target geographical location. For another example, the target application may be a payment application. Then, the user may set, as a target geographical location, a location at which the user usually needs to pay every day. For example, a convenience store, a supermarket, a cinema, or the like is set as a target geographical location.

The target geographical location configured in the target application may be determined in real time. For example, the target application is a taxi hailing application. Then, after the user starts the taxi hailing application, the user may enter a destination. In this case, information about the destination received by the target application may be obtained, and the destination is set as a target geographical location.

Certainly, there may be another manner of setting a target geographical location, and this is not limited herein.

After the target geographical location is set in the smartwatch by using an input interface such as the touchscreen, the processor may store, in the memory, a correspondence between the target geographical location collected by using the input interface and the target application. In this way, when the target application is started, the processor may invoke, from the memory, information about the target geographical location configured in the target application.

S403. Obtain a current geographical location of the smartwatch.

It may be understood that the current geographical location of the smartwatch is a current geographical location of the user wearing the smartwatch.

For example, the processor of the smartwatch may obtain the current geographical location of the smartwatch by using a positioning module of the smartwatch. For example, the processor invokes a GPS module to perform positioning, and after the GPS obtains positioning data, the processor obtains the positioning data collected by the GPS.

S404. Detect whether a distance between the current geographical location of the smartwatch and the target geographical location is less than a preset distance threshold, and if the distance is less than the preset distance threshold, perform step S405, or if the distance is not less than the preset distance threshold, perform step S403.

For example, the processor compares information about the geographical location collected by the positioning module of the smartwatch and information about the target geographical location that is configured in the target application and that is stored in the memory, and determines whether the distance between the current geographical location of the smartwatch and the target geographical location stored in the memory is less than the preset distance threshold, to determine whether the smartwatch currently is close to or is to arrive at the target geographical location.

It should be noted that for ease of distinguishing between the preset distance threshold and a subsequent distance threshold, the preset distance threshold in this embodiment may be referred to as a first preset distance threshold.

S405. If the distance between the current geographical location of the smartwatch and the target geographical location is less than the preset distance threshold, determine whether a service type bound to the target geographical location is a service type needing PPG authentication, and if the service type is a service type needing PPG authentication, perform step S406, or if the service type is not a service type needing PPG authentication, perform step S410.

After the distance between the current geographical location of the smartwatch and the target geographical location is determined, the distance is compared with the preset distance threshold. If the distance is less than the distance threshold, it indicates that the user is to arrive at the target geographical location.

It may be understood that one application may perform a plurality of different services. For example, in addition to a transfer service, a payment service, and the like, a payment application may implement services such as interface unlocking authentication and instant messaging. For an application, the user may perform different services at different target geographical locations. Therefore, in this application, different target geographical locations may be bound to different service types. For example, the memory stores service types bound to different target geographical locations. Different service types require different security levels. The smartwatch may preset, as a service type needing PPG authentication, a service type having a relatively high security level requirement. For example, a payment service usually has a relatively high security level requirement. Therefore, if a service type is a payment service, PPG authentication needs to be performed. To be specific, a PPG template is set for the payment service, and during authentication, matching is performed between a collected. PPG signal of the user and a PPG template signal. Services such as interface unlocking authentication and instant messaging have relatively low security level requirements, and the services are set as service types needing no PPG authentication, so that there is no need to trigger a subsequent operation of pre-collecting a PPG signal of the user, and when an application initiates identity authentication for this service type, identity authentication may be performed in the wearing detection manner described above.

It should be noted that if the distance between the current geographical location of the smartwatch and the target geographical location is less than the preset distance threshold, the "determining whether a service type bound to the target geographical location is a service type needing PPG authentication" is not a necessary step. When the target application includes a single service type, or a service type that may be performed by the target application requires a relatively high security level, an operation of pre-collecting a PPG signal of the user can be triggered provided that the user is to arrive at the target geographical location, and there is no need to determine whether the service type is a service type needing PPG authentication.

S406. Detect whether an identity authentication result obtained after the smartwatch successfully performs PPG authentication most recently still meets time validity, and if the identity authentication result meets the time validity, determine that the authentication succeeds, and maintain a most recent PPG authentication result, or if the identity authentication result does not meet the time validity, perform step S407.

It may be understood that in this embodiment of this application, when PPG authentication is performed by performing matching between a most recently stored PPG signal and the PPG template signal when a PPG authentication request initiated by an application is subsequently detected, when it is determined that the most recent PPG authentication success result meets the time validity, a PPG signal used for most recent PPG authentication may be maintained, so that there is no need to re-collect a PPG signal.

For step S406, refer to the related descriptions of step S305, and details are not described herein again.

Similar to step S305, in this embodiment, when it is determined that the current geographical location of the smartwatch is to coincide with the target geographical location, and it is determined that the service type is a service type needing PPG authentication, step S407 may be directly performed and step S406 may be skipped.

S407. Collect a current PPG signal of the user, and use the PPG signal as a to-be-authenticated PPG signal.

In an implementation, after the to-be-authenticated PPG signal is collected, the to-be-authenticated PPG signal may be further stored.

S408. Perform matching between the to-be-authenticated PPG signal and the PPG template signal, obtain a PPG authentication result, and store the PPG authentication result.

S409. When a PPG authentication request initiated by an application is detected, invoke a most recently stored PPG authentication result.

It may be understood that step S408 and step S409 are described by using an example in which identity authentication is performed based on the stored to-be-authenticated PPG signal. However, it may be understood that another implementation of performing identity authentication based on the stored to-be-authenticated PPG signal in the embodiment of FIG. 3 is also applicable to this embodiment, and details are not described herein again.

S410. If a non-PPG authentication identity authentication request initiated by an application is detected, detect whether the smartwatch is always in a worn state within a time period between a moment at which PPG authentication of the target application on the user succeeds most recently and a current moment, and when it is detected that the smartwatch is always in the worn state, determine that user identity authentication succeeds.

For example, if an application needing no PPG authentication initiates an identity authentication request, or an application initiates an identity authentication request when performing a service needing no PPG authentication, the identity authentication request is not a PPG authentication request. Therefore, an intelligent terminal may perform identity authentication through wearing detection.

For a specific process of step S410, refer to the related descriptions of step S308 in the foregoing embodiment, and details are not described herein again.

In this embodiment of this application, when it is detected that the target application needing PPG authentication is started, the target geographical location configured in the target application is obtained. If the distance between the geographical location of the smartwatch and the target geographical location is less than the preset distance threshold, the smartwatch collects the current PPG signal of the user as the to-be-authenticated PPG signal. In this way, when the smartwatch arrives at the target geographical location and needs to perform PPG authentication, PPG authentication may be directly performed based on the collected to-be-authenticated PPG signal, thereby reducing a case in which timeliness of PPG authentication is affected by an excessively long PPG signal collection time. In addition, when it is determined that the distance between the current geographical location of the smartwatch and the target geographical location is less than the preset distance threshold, it may indicate that the target application is to need PPG authentication. In this way, before needing to perform PPG authentication, the smartwatch collects the to-be-authenticated PPG signal required for PPG authentication, thereby avoiding resource consumption caused by periodic PPG signal collection, and helping reduce power consumption.

For ease of understanding of the solution of the embodiment shown in FIG. 4A and FIG. 4B, the following describes the solution of this embodiment in this application with reference to several application scenarios.

First, a description is provided by using an example in which the target application is taxi hailing software. When the user travels, the user opens the taxi-hailing software to hail a taxi, and enters a destination "Kunming Zoo" in the taxi hailing software. Then, the smartwatch detects that the taxi hailing software is started, and obtains a target geographical location "Kunming Zoo". The smartwatch detects a current geographical location of the smartwatch, and compares the geographical location of the smartwatch with the destination. If the geographical location of the smartwatch is to coincide with the destination (for example, the smartwatch is further 0.5 kilometers away from the destination), the smartwatch starts a PPG data collection module in advance to collect a current PPG signal of the user. In this way, after arriving at the destination, the smartwatch can perform identity authentication based on the pre-collected PPG signal (for example, perform matching between the pre-collected PPG signal and the PPG template signal, or obtain a PPG authentication result obtained after matching is performed between the PPG signal and the PPG template signal) when receiving a PPG authentication request of the taxi hailing software, to complete identity authentication during fare payment.

For another example, for a payment application, in consideration of security, identity authentication needs to be performed based on a PPG signal during payment. A target geographical location preset in the payment application may be an entrance to a convenience store, a cinema, or a supermarket. After the smartwatch detects that the payment application is started, the smartwatch detects a distance between a geographical location of the smartwatch and any target geographical location. If a distance between a current geographical location of the smartwatch and a target geographical location is less than a preset distance threshold, it indicates that the user is to arrive at a place at which payment needs to be made, for example, the cinema, the supermarket, or the convenience store. Therefore, to ensure timely identity authentication during payment, the smartwatch pre-collects a PPG signal of the user before arriving at the target geographical location at which payment needs to be made, and performs payment authentication based on the pre-collected PPG signal when payment authentication needs to be performed. In this way, not only timeliness of payment authentication is ensured, but also power consumption caused by periodic PPG signal collection can be reduced.

Certainly, for some applications having a punch-in/out function, a company address may be set as a target geographical location. In this way, when a terminal device detects that the user is near to the company, the terminal device may pre-collect a PPG signal of the user, so that when the terminal device needs to be unlocked for punch-in/out, PPG authentication may be directly performed by using the collected PPG signal, thereby verifying validity of the user identity.

Figure 5:
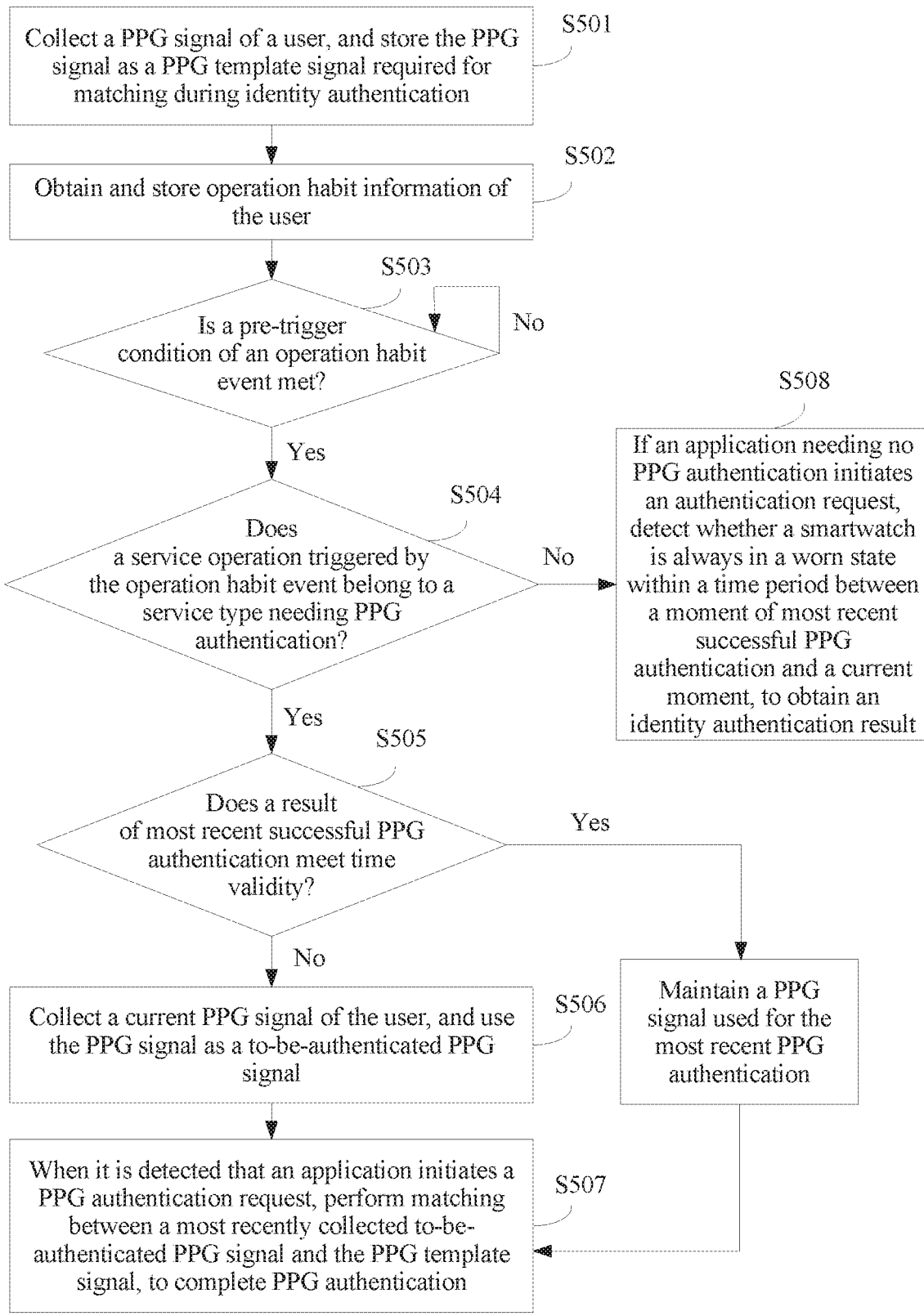
FIG. 5 is a schematic flowchart of another embodiment of a PPG authentication method according to this application.

The following describes, by using another PPG signal pre-collection trigger condition as an example, another application scenario to which the PPG authentication method in this application is applicable. For example, FIG. 5 is a schematic flowchart of another embodiment of a PPG authentication method according to this application. The method in this embodiment still uses an example in which the method is applied to a smartwatch. The method in this embodiment may include the following steps.

S501. Collect a PPG signal of a user, and store the collected PPG signal as a PPG template signal required for matching during identity authentication.

For step S501, refer to the descriptions of the corresponding step in the foregoing embodiment, and details are not described herein again.

S502. Obtain and store operation habit information of the user.

An operation habit of the user may reflect a moment or a location at which PPG authentication needs to be performed on the user, or a case in which PPG authentication needs to be performed on the user. Therefore, collecting the operation habit information of the user helps start, subsequently based on an operation habit of the user, a PPG data collection module in a PPG sensor in advance to collect a PPG signal of the user, so that the PPG signal of the user may be pre-collected before PPG authentication needs to be performed. The operation habit of the user may be obtained by a processor by collecting and extracting information about operation behavior of the user in an application. After obtaining the operation habit information of the user through analysis, the processor may store the operation habit information of the user in a memory.

In this embodiment of this application, the operation habit information may include an operation habit of the user and a condition of triggering the operation habit. For example, the operation habit information of the user may include the following several possible cases.

In a possible case, the operation habit information may be an event operation performed based on a time. For example, the user goes to restaurants for dining at 8 o'clock am and 12 o'clock am, and pays a meal fee by using payment software in the smartwatch, and identity authentication is performed based on a PPG signal during meal fee payment.

In another possible case, the operation habit information may be an event operation performed based on a frequent destination. For example, frequent destinations such as a gasoline station, a bakery, a convenience store, and a subway station that the user usually goes to are recorded. Identity authentication needs to be performed on the user based on a PPG signal of the user at the frequent destinations, to complete payment, identity authentication, or the like.

In another possible case, the operation habit information may be an event operation triggered by a key word entered by the user. For example, the user enters key words such as a supermarket name, a product name, a name of a recently shown film, and borrowing some money, to trigger a need of performing identity authentication on the user based on a PPG signal of the user, to complete identity authentication required for operations, for example, the user buys a product, buys a movie ticket, and makes a transfer.

In another possible case, the operation habit information may be an operation record of the user, for example, an operation record of the user in an application such as an operation record of the user during a game (the operation habit information may be used to predict whether the user buys game items, so that a PPG signal required for user identity authentication is collected before the user buys the game items), and an exercise record of the user (used to predict whether the user is bound to exercise data through identity authentication, so that a PPG signal required for identity authentication is obtained before identity authentication).

Certainly, the foregoing merely lists several possible cases of the operation habit information. In actual application, there may be a plurality of other cases of the operation habit information, and this is not limited herein.

S503. Detect, based on the stored operation habit information, whether a pre-trigger condition of an operation habit event is met currently, if the pre-trigger condition is met currently, perform step S504, or if the pre-trigger condition is not met currently, continue to perform step S503.

For an operation habit event, a pre-trigger condition of the operation habit event and an occurrence condition of the operation habit event meet a particular relationship, and usually, a moment meeting the pre-trigger condition of the operation habit event is earlier than a moment meeting the occurrence condition of the operation habit event.

For example, the pre-trigger condition of the operation habit event includes any one or more of the following:

a time difference between a moment at which the operation habit event occurs and a current moment is less than a preset time threshold; and a distance between a current geographical location of a terminal and a location at which the operation habit event occurs is less than a second preset distance threshold. For ease of distinguishing between the second preset distance threshold and the foregoing first preset distance threshold, the distance threshold specified in this embodiment is referred to as a second preset distance threshold. However, it may be understood that values of the first preset distance threshold and the second preset distance threshold may be the same or may be different.

Certainly, the pre-trigger condition of the operation habit event may alternatively be the occurrence condition of the operation habit event.

The occurrence condition of the operation habit event may be a moment, a location, or the like at which occurrence of the operation habit event is triggered. For example, if the operation habit information is buying breakfast by using payment software at 8 o'clock am every day, if it is detected that a current moment is 8 o'clock am, it indicates that an occurrence condition of buying breakfast by using the payment software is met currently. For another example, if the operation habit information is that identity authentication is performed on the user by using a particular application at a specified office location, if it is detected that a current location is the specified office location, it indicates that an occurrence condition of performing identity authentication by using the application is met currently.

S504. Determine a service type of a service operation triggered by a target operation habit event meeting an occurrence condition, detect whether the service type is a service type needing PPG authentication, and if the service type is a service type needing PPG authentication, perform step S505, or if the service type is not a service type needing PPG authentication, perform step S508.

For ease of distinguishing, in this embodiment, an operation habit currently meeting the occurrence condition is referred to as a target operation habit.

Different operation habits may trigger different service operations. For example, the service operations may be punching in/out, shopping, transferring, and unlocking. Similar to the embodiment of FIG. 4A and FIG. 4B, the service operations may be classified into a plurality of service types, and different service types may be classified into two categories. One is a service needing PPG authentication, and for example, may be specifically a service having a high security level. The other is a service type needing no PPG authentication. For example, the service type may include a payment service having a relatively high security level requirement. If a service operation triggered by an operation habit is a payment service, PPG authentication needs to be performed. The service type may further include a service needing no PPG authentication, for example, an unlocking service having a relatively low security level requirement.

It should be noted that "determining whether the service type triggered by the target operation habit is a service type needing PPG authentication" is not a necessary step, and when each collected target operation habit is an operation habit that may trigger a service type needing PPG authentication, there is no need to determine whether the service type is a service type needing PPG authentication.

S505. Detect whether an identity authentication result obtained after the smartwatch successfully performs PPG authentication most recently still meets time validity, and if the identity authentication result meets the time validity, determine that the authentication succeeds, and maintain a PPG signal used for the most recent PPG authentication, or if the identity authentication result does not meet the time validity, perform step S506.

For step S505, refer to the related descriptions of step S305, and details are not described herein again.

Similar to step S305, in this embodiment, step S506 may be directly performed and step S505 may be skipped.

S506. Collect a current PPG signal of the user, use the current PPG signal as a to-be-authenticated PPG signal, and store the to-be-authenticated PPG signal.

S507. When a PPG authentication request initiated by an application is detected, perform matching between the stored to-be-authenticated PPG signal and a PPG template signal, to perform user identity authentication.

It may be understood that step S507 is described by using an example in which identity authentication is performed based on the stored to-be-authenticated PPG signal. However, it may be understood that another implementation of performing identity authentication based on the stored to-be-authenticated PPG signal in the embodiment of FIG. 3 is also applicable to this embodiment, and details are not described herein again.

S508. If a non-PPG authentication identity authentication request initiated by an application is detected, detect whether the smartwatch is always in a worn state within a time period between a moment at which the smartwatch successfully performs PPG authentication on the user most recently and a current moment, and when it is detected that the smartwatch is always in the worn state, determine that user identity authentication succeeds.

For example, when an application performs a service operation needing no PPG authentication, an authentication request initiated by the application may be a common identity authentication request needing no PPG authentication.

It may be understood that in a process of performing step S503 to step S508, user operation habits may be recorded constantly, so that an occurrence condition of an operation habit is dynamically adjusted based on a change of the user operation habit. Correspondingly, after the occurrence condition of the operation habit is adjusted, a start occasion of a PPG identification module may be adjusted.

Figure 6A:
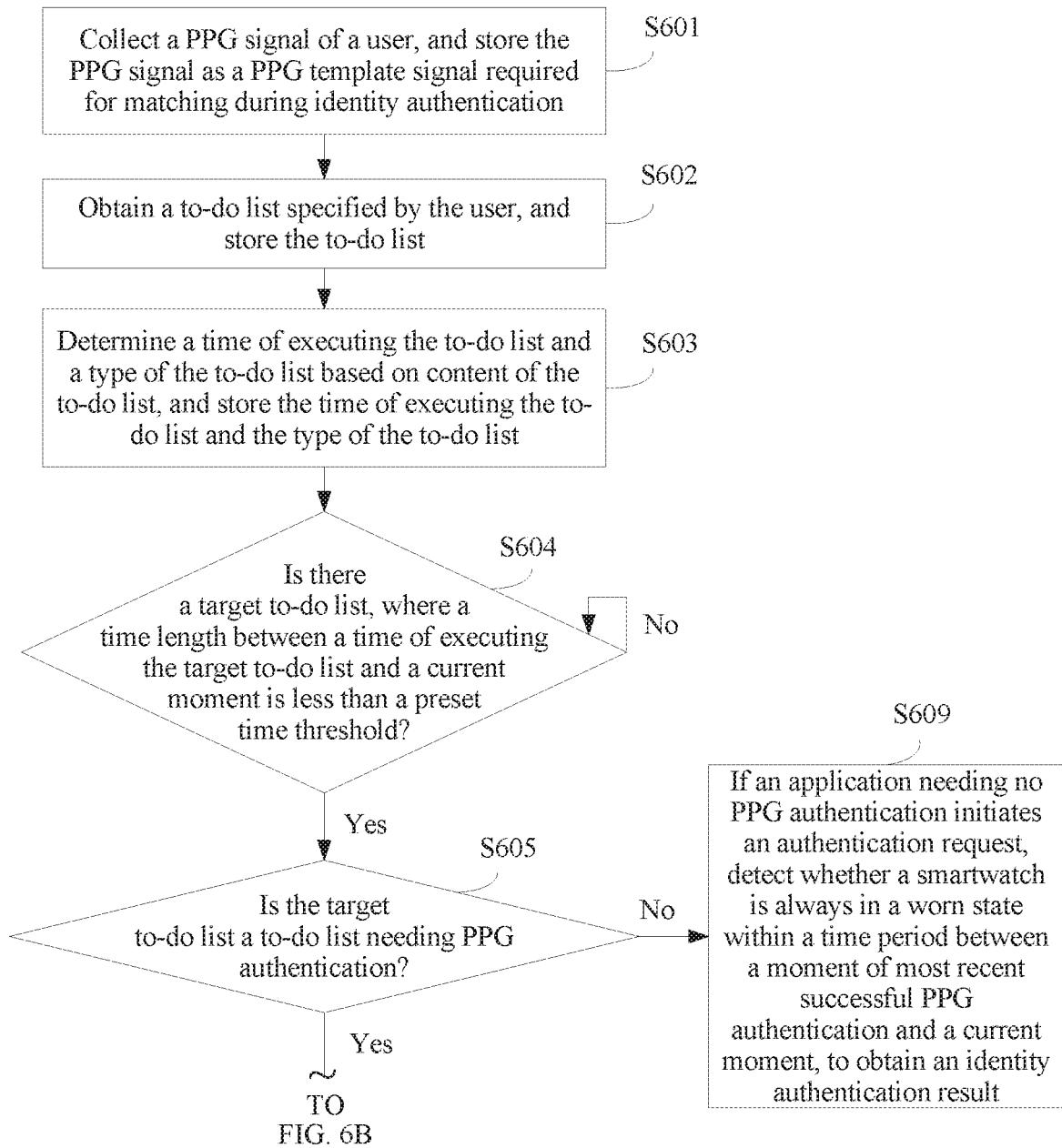
FIG. 6A and FIG. 6B are a schematic flowchart of another embodiment of a PPG authentication method according to this application.
Figure 6B:
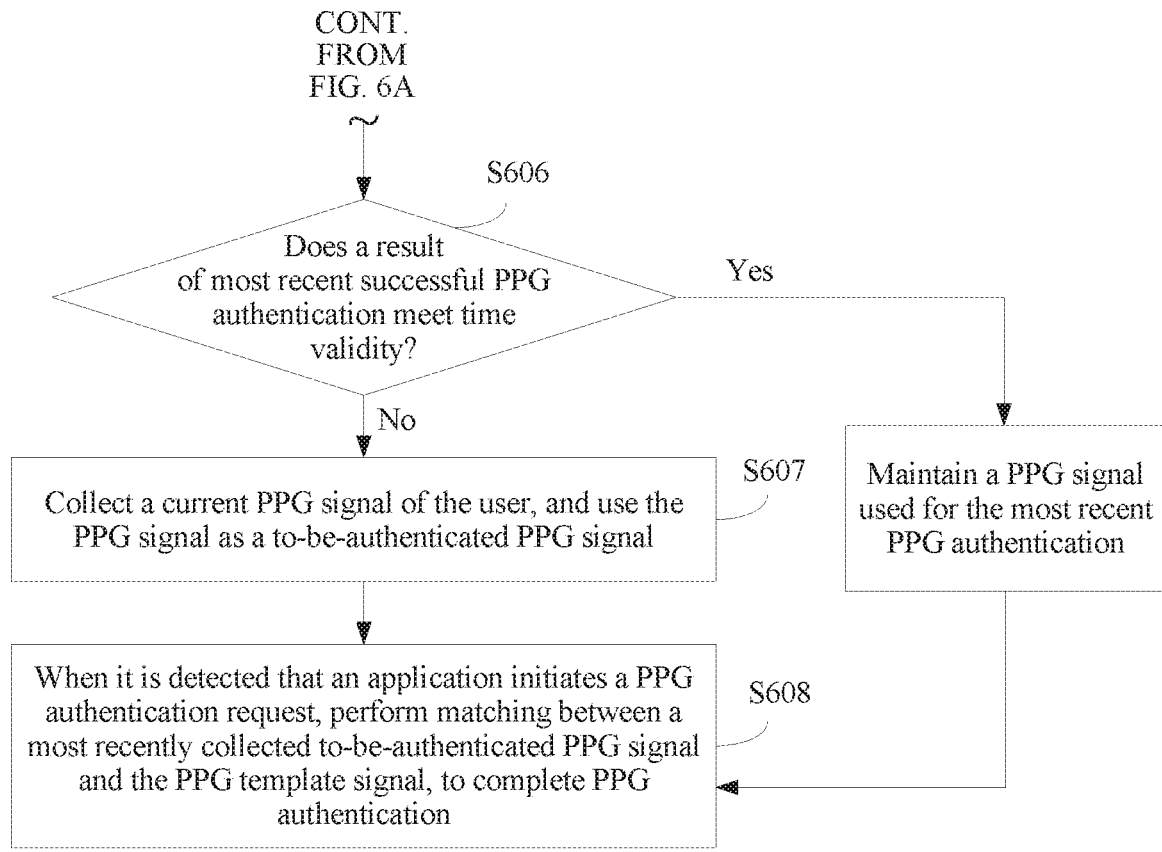

The following describes a PPG authentication method in this application by using another condition of triggering pre-collection of a PPG signal of a user as an example. For example, FIG. 6A and FIG. 6B are a schematic flowchart of another embodiment of a PPG authentication method according to this application. The method in this embodiment still uses an example in which the method is applied to a smartwatch. The method in this embodiment may include the following steps.

S601. Collect a PPG signal of a user, and store the collected PPG signal as a PPG template signal required for matching during identity authentication.

For step S601, refer to the descriptions of the corresponding step in the foregoing embodiment, and details are not described herein again.

S602. Obtain a to-do list specified by the user, and store the to-do list.

The to-do list is some reminders that are specified by the user and that need to be processed after a current moment. For example, the user enters some to-do lists in an application interface of an application by using an input interface such as a touchscreen. After collecting information about the to-do lists entered by using the input interface, a processor invokes an interface provided by a memory, to store the to-do lists specified by the user.

The to-do list may have a plurality of forms. For example, the to-do list may include a recharging prompt (for example, a recharging prompt for arrears), a rent payment prompt, and scheduling. For example, the scheduling may include "going to a movie at 3 o'clock pm" or "boarding the plane for Xi'an at 3 o'clock pm", or may be "going to a supermarket to buy milk at 5 o'clock pm".

It may be understood that the user may set a plurality of to-do lists. In this embodiment of this application, the to-do lists may be stored in a form of a list.

S603. Determine a time of executing the to-do list and a type of the to-do list based on content of the to-do list, and store the time of executing the to-do list and the type of the to-do list.

The type of the to-do list is used to indicate whether the to-do list needs identity authentication. For example, the to-do list may be classified into two categories. One is a to-do list needing real-time identity authentication, and the other is a to-do list needing non-real-time identity authentication. PPG authentication needs to be performed in a process of executing a to-do list needing real-time identity authentication. To be specific, a PPG template is preset. During authentication, matching is performed between collected PPG data and the PPG template, and if a matching threshold is reached, PPG authentication succeeds, or if a matching threshold is not reached, PPG authentication fails. There is no need to perform PPG authentication in a process of executing a to-do list needing non-real-time identity authentication. For example, authentication may be performed only through wearing detection mentioned above.

There may be a plurality of manners of determining the type of the to-do list.

For example, in a possible case, the processor may determine the type of the to-do list based on a key word included in the to-do list. For example, a correspondence between different key words and types of to-do lists may be preset in the memory. In this way, the processor determines the type of the to-do list based on the correspondence stored in the memory and a key word included in the to-do list. For example, it is assumed that the to-do list includes a key word such as "shopping" or "supermarket". It indicates that the smartwatch needs to perform PPG authentication on the user when executing the to-do list, and when it is detected that the to-do list includes "shopping" or "supermarket", it is determined that the type of the to-do list is an item type needing PPG authentication.

In another possible case, the type of the to-do list is set or included in content of the to-do list stored in the memory. In this case, the processor may directly extract the type of the to-do list from information about the to-do list stored in the memory. For example, the to-do list is recharging, and a type of the recharging item may be an item needing PPG authentication. Then, when storing the to-do list, the memory may store an item type of the to-do list as an item needing PPG authentication, and the processor may directly invoke the memory to query the type of the to-do list.

Certainly, there may be another manner of determining the type of the to-do list, and this is not limited herein.

S604. Detect whether the stored to-do list includes a target to-do list, where a time length between a time of executing the target to-do list and a current moment is less than a preset time threshold, and if the stored to-do list includes the target to-do list, perform step S605, or if the stored to-do list does not include the target to-do list, continue to monitor the to-do list.

The preset time threshold may be set based on a requirement. For example, the preset time threshold may be 1 minute. In this way, if a time difference between a time of executing a to-do list and a current moment is less than 1 minute, it indicates that the to-do list is a to-be-processed target to-do list. S605. Detect, based on a type of the target to-do list, whether the target to-do list is a to-do list needing PPG authentication, and if the target to-do list is a to-do list needing PPG authentication, perform step S606, or if the target to-do list is not a to-do list needing PPG authentication, perform step S609.

It may be understood that when each stored to-do list is a to-do list needing PPG authentication, there is no need to perform step S603 of determining the type of the to-do list and detecting whether the type of the target to-do list is a to-do list needing PPG authentication. In this case, step S606 may be directly performed and step S605 may be skipped.

It should be noted that the preset time threshold in step S604 may be the same as or different from the present time threshold in step S503. For ease of distinguishing, in this embodiment of this application, the preset time threshold in step S604 may be referred to as a first preset time threshold and the preset time threshold in step S503 may be referred to as a second preset time threshold.

S606. Detect whether an identity authentication result of most recent successful PPG authentication still meets time validity, and if the identity authentication result meets the time validity, determine that the authentication succeeds, or if the identity authentication result does not meet the time validity, perform step S607.

For step S606, refer to the related descriptions of step S305, and details are not described herein again.

Similar to step S305, in this embodiment, step S607 may be directly performed and step S606 may be skipped.

S607. Collect a current PPG signal of the user, use the current PPG signal as a to-be-authenticated PPG signal, and store the to-be-authenticated PPG signal.

S608. When a PPG authentication request initiated by an application is detected, perform matching between the stored to-be-authenticated PPG signal and a PPG template signal, to perform user identity authentication.

In this embodiment of this application, the PPG authentication request initiated by the application may be a PPG authentication request that is initiated when the application configured to execute a target to-do list detects that a condition of executing, by the application, the target to-do list is met currently, or may be a PPG authentication request that is initiated by any application in the smartwatch to an operating system of the smartwatch when the application needs PPG authentication.

It may be understood that step S608 is described by using an example in which identity authentication is performed based on the stored to-be-authenticated PPG signal. However, it may be understood that another implementation of performing identity authentication based on the stored to-be-authenticated PPG signal in the embodiment of FIG. 3 is also applicable to this embodiment, and details are not described herein again.

S609. Detect whether the smartwatch is always in a worn state within a time period between a moment at which the smartwatch successfully performs PPG authentication on the user most recently and a current moment, and when it is detected that the smartwatch is always in the worn state, determine that user identity authentication succeeds.

For step S609, refer to the related descriptions in the foregoing embodiment, and details are not described herein again.

It should be noted that the foregoing embodiments of this application each are described by using one PPG signal pre-collection trigger condition as an example. However, it may be understood that in actual application, the PPG signal pre-collection trigger condition may include one or more of the foregoing trigger conditions. In this case, the memory may store one or more PPG signal pre-collection trigger conditions at the same time, and when detecting whether any one or more PPG signal pre-collection trigger conditions stored in the memory are met currently, the processor may invoke an interface of a sensor, to trigger the sensor to collect a current PPG signal of a user.

In addition, the foregoing embodiments of this application are described by using an example in which the terminal is a smartwatch. However, it may be understood that when the terminal is a mobile terminal such as a mobile phone, or a wearable intelligent device such as a head-mounted intelligent terminal, the foregoing embodiments are also applicable.

Figure 7:
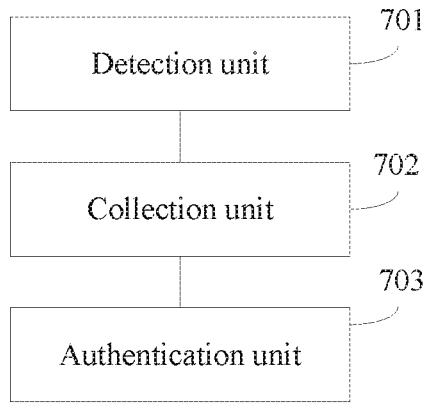
FIG. 7 is a schematic diagram of a compositional structure of an embodiment of a PPG authentication apparatus according to this application.

In addition, an embodiment of this application provides a PPG authentication apparatus. FIG. 7 is a schematic diagram of a compositional structure of an embodiment of the PPG authentication apparatus according to this application. The apparatus in this embodiment may include:

a detection unit 701, configured to detect whether a PPG signal pre-collection trigger condition is met currently;

a collection unit 702, configured to: if the PPG signal pre-collection trigger condition is met currently, collect a current PPG signal of a user; and an authentication unit 703, configured to perform PPG authentication based on the most recently collected PPG signal if it is detected that an application initiates a PPG authentication request.

In a possible implementation, the detection unit is specifically configured to detect whether any one or more PPG signal pre-collection trigger conditions of the following are met currently:

an application needing PPG authentication is started;

an application needing PPG authentication is started, and a distance between a current geographical location of a terminal and a target geographical location is less than a first preset distance threshold, where the target geographical location is a geographical location configured in the application;

a time difference between a moment of executing a to-do list and a current moment is less than a first preset time threshold; and a pre-trigger condition of an operation habit event, where a moment meeting the pre-trigger condition is earlier than a moment meeting an occurrence condition of the operation habit event.

In a possible case, the pre-trigger condition of the operation habit event includes any one or more of the following:

a time difference between a moment at which the operation habit event occurs and a current moment is less than a second preset time threshold; and a distance between a current geographical location of the terminal and a location at which the operation habit event occurs is less than a second preset distance threshold.

In a possible case, the authentication unit includes:

a first authentication subunit, configured to: if it is detected that the application initiates the PPG authentication request, perform matching between the most recently collected PPG signal and a stored PPG template signal, to complete PPG authentication.

In a possible case, the apparatus may further include:

the detection unit is configured to: before the first authentication subunit performs matching between the most recently collected PPG signal and the stored PPG template signal, detect whether a time length between a moment at which the PPG signal is collected most recently and a current moment is less than a preset time length.

Correspondingly, the first authentication subunit is specifically configured to: if the time length between the moment at which the PPG signal is collected most recently and the current moment is less than the preset time length, perform matching between the most recently collected PPG signal and the stored PPG template signal.

Further, the apparatus may further include:

a re-collection unit, configured to: if the time length between the moment at which the PPG signal is collected most recently and the current moment is greater than the preset time length, collect a current PPG signal of the user.

The first authentication subunit is specifically configured to perform matching between the PPG signal currently collected by the re-collection unit and the PPG template signal, to complete PPG authentication.

In a possible case, the apparatus may further include:

a pre-authentication unit, configured to: after the collection unit collects the current PPG signal of the user, perform matching between the collected PPG signal and a stored PPG template signal, and store a matching result as a PPG authentication result.

The authentication unit includes:

a second authentication subunit, configured to: if it is detected that the application initiates the PPG authentication request, invoke a most recently stored PPG authentication result.

In a possible case, the apparatus may further include:

a time validity detection unit, configured to: before the collection unit collects the current PPG signal of the user, detect whether a PPG authentication success result of most recent successful authentication meets time validity, where that the PPG authentication success result meets the time validity indicates that a time length between a moment of generating the PPG authentication success result and a current moment is less than a preset valid time length.

The collection unit is specifically configured to: if the time validity detection unit determines that the PPG authentication success result does not meet the time validity, collect a current PPG signal of the user.

The embodiments in this application are all described in a progressive manner. For same or similar parts in the embodiments, refer to these embodiments, and each embodiment focuses on a difference from other embodiments. The apparatus disclosed in the embodiments is described relatively simply because it corresponds to the method disclosed in the embodiments, and for parts related to those of the method, refer to the description of the method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The steps in the method or algorithm described in the embodiments disclosed in this specification may be implemented directly by hardware, a software module executed by a processor, or a combination of hardware and a software module. The software module may reside in a random access memory (RAM), a memory, a read-only memory (ROM), an electrically programmable ROM, an electrically erasable programmable ROM, a register, a hard disk, a removable disk, a CD-ROM, or any other form of storage medium known in the art.

The embodiments disclosed above are described to enable a person skilled in the art to implement or use this application. Various modifications made to the embodiments are obvious to a person skilled in the art, and general principles defined herein may also be implemented in other embodiments without departing from the spirit or scope of this application. Therefore, this application is not limited to these embodiments described herein, but shall be construed in the widest scope consistent with the principles and novel features disclosed herein.

What is claimed is:

1. A wearable device, comprising:
a memory configured to store software programs;
a sensor configured to collect a photoplethysmogram (PPG) signal of a user; and
at least one processor coupled to the memory and the sensor, wherein the at least one processor is configured to implement the software programs to cause the wearable device to:
collect and store a first PPG signal of the user when determining the user wears the wearable device and a PPG signal pre-collection trigger condition is met;
detect a first PPG authentication request initiated by a first application in the wearable device; and
perform, authentication by utilizing the first PPG signal stored at the wearable device without collecting a new PPG signal when determining a time interval between collecting the first PPG signal and detecting the first PPG authentication request is less than a first time threshold or when the wearable device is not taken off during the time interval, and perform authentication by collecting and matching the new PPG signal with a stored PPG template signal when the time interval is greater than or equal to the first time threshold or when the wearable device is taken off during the time interval.

2. The wearable device of claim 1, wherein the at least one processor is further configured to implement the software programs to cause the wearable device to:
implement a check-in service of the first application, implement a transfer service of the first application, implement a payment service of the first application, or display a first user interface of the first application when the authentication succeeds; and
avoid implementing the check-in service, the transfer service, the payment service of the first application, or avoid displaying the first user interface of the first application when the authentication fails.

3. The wearable device of claim 2, wherein the PPG signal pre-collection trigger condition is met when the first application is started.

4. The wearable device of claim 2, wherein the PPG signal pre-collection trigger condition is met when the first application is started and a distance between a current geographical location of the wearable device and a target geographical location is less than a first preset distance threshold, and wherein the target geographical location is configured for the first application.

5. The wearable device of claim 2, wherein the PPG signal pre-collection trigger condition is met when a time interval between a moment at which an operation habit event occurs and a current moment is less than a first preset time threshold.

6. The wearable device of claim 2, wherein the PPG signal pre-collection trigger condition is met when a distance between a current geographical location of the wearable device and a geographical location at which an operation habit event occurs is less than a second preset distance threshold.

7. The wearable device of claim 6, wherein the at least one processor is further configured to implement the software programs to cause the wearable device to:
collect a second PPG signal of the user when the user wears the wearable device and the PPG signal pre-collection trigger condition is met; and
perform authentication by utilizing the first PPG signal without collecting the new PPG signal when the first PPG signal is collected after collecting the second PPG signal.

8. The wearable device of claim 2, wherein after detecting the first PPG authentication request, the at least one processor is further configured to implement the software programs to cause the wearable device to perform authentication by matching the first PPG signal with the stored PPG template signal without collecting the new PPG signal.

9. The wearable device of claim 2, wherein the at least one processor is further configured to implement the software programs to cause the wearable device to:
match the first PPG signal with the stored PPG template signal before detecting the first PPG authentication request; and
perform authentication by utilizing a result of matching the first PPG signal with the stored PPG template signal without collecting the new PPG signal.

10. The wearable device of claim 2, wherein the at least one processor is further configured to implement the software programs to cause the wearable device to:
collect a second PPG signal of the user when the user wears the wearable device and the PPG signal pre-collection trigger condition is met; and
perform authentication by utilizing the first PPG signal without collecting the new PPG signal when the first PPG signal is collected after collecting the second PPG signal.

11. A system on chip of a user device, comprising:
a memory configured to store software programs; and
at least one processor coupled to the memory, wherein the software programs cause the at least one processor to be configured to:

receive a first PPG signal of a user of the user device when determining the user wears a wearable device coupled to the user device and a PPG signal pre-collection trigger condition is met, wherein the first PPG signal is stored at the user device or the wearable device;

detect a first PPG authentication request initiated by a first application; and perform, authentication by utilizing the first PPG signal without collecting a new PPG signal when determining a time interval between collecting the first PPG signal and detecting the first PPG authentication request is less than a first time threshold or when the wearable device is not taken off during the interval, and perform authentication by receiving and matching the new PPG signal with a stored PPG template signal when the time interval is greater than or equal to the first time threshold or when the wearable device is taken off during the time interval.

12. The system on chip of claim 11, wherein the software programs further cause the at least one processor to be configured to:

implement a check-in service of the first application, implement a transfer service of the first application, implement a payment service of the first application, or display a first user interface of the first application when the authentication succeeds; and avoid implementing the check-in service, the transfer service, the payment service of the first application, or avoid displaying the first user interface of the first application when the authentication fails.

13. The system on chip of claim 12, wherein after detecting the first PPG authentication request, the software programs further cause the at least one processor to be configured to perform authentication by matching the first PPG signal with the stored PPG template signal without collecting the new PPG signal.

14. The system on chip of claim 12, wherein the software programs further cause the at least one processor to be configured to:

match the first PPG signal with the stored PPG template signal before detecting the first PPG authentication request; and perform authentication by utilizing a result of matching the first PPG signal with the stored PPG template signal without collecting the new PPG signal.

15. The system on chip of claim 12, wherein the software programs further cause the at least one processor to be configured to:

receive a collected second PPG signal of the user when the user wears the wearable device and the PPG signal pre-collection trigger condition is met; and perform authentication by utilizing the first PPG signal without collecting the new PPG signal when the first PPG signal is collected after collecting the second PPG signal.

16. The system on chip of claim 11, wherein the PPG signal pre-collection trigger condition is met when the first application is started or a distance between a current geographical location of the wearable device and a target geographical location is less than a first preset distance threshold, and wherein the target geographical location is configured for the first application.

17. The system on chip of claim 11, wherein the PPG signal pre-collection trigger condition is met when a time interval between a moment at which an operation habit event occurs and a current moment is less than a first preset time threshold.

18. The system on chip of claim 11, wherein the PPG signal pre-collection trigger condition is met when a distance between a current geographical location of the wearable device and a geographical location at which an operation habit event occurs is less than a second preset distance threshold.

19. The system on chip of claim 18, wherein the software programs further cause the at least one processor to be configured to:

receive a collected second PPG signal of the user when the user wears the wearable device and the PPG signal pre-collection trigger condition is met; and perform authentication by utilizing the first PPG signal without collecting the new PPG signal when the first PPG signal is collected after collecting the second PPG signal.

20. A method implemented by a user operated device, wherein the method comprises:

collecting a first PPG signal of a user of the user operated device when determining the user wears the user operated device or a wearable device coupled to the user operated device and a PPG signal pre-collection trigger condition is met, wherein the first PPG signal is stored at the user operated device or the wearable device;

detecting a first PPG authentication request initiated by a first application; and performing authentication by utilizing the first PPG signal without collecting a new PPG signal when determining a time interval between collecting the first PPG signal and detecting the first PPG authentication request is less than a first time threshold or when the user operated device or the wearable device is not taken off during the time interval, and performing authentication by collecting and matching the new PPG signal with a stored PPG template signal when the time interval is greater than or equal to the first time threshold or when the user operated device or the wearable device is taken off during the time interval.

* * * * *